(12) United States Patent
Yang

(10) Patent No.: US 10,663,104 B2
(45) Date of Patent: May 26, 2020

(54) FULL-AUTOMATIC HORIZONTAL CLAMPING HOLDER

(71) Applicant: Shenzhen Annaijia Electronics Co., Ltd., Shenzhen (CN)

(72) Inventor: Weiyu Yang, Shenzhen (CN)

(73) Assignee: SHENZHEN ANNAIJIA ELECTRONICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/706,812

(22) Filed: Dec. 8, 2019

(65) Prior Publication Data

US 2020/0109812 A1 Apr. 9, 2020

Related U.S. Application Data

(62) Division of application No. 15/561,073, filed on Sep. 25, 2017, now Pat. No. 10,533,699.

(51) Int. Cl.

| F16M 11/04 | (2006.01) |
|---|---|
| H04B 1/3877 | (2015.01) |
| F16M 13/02 | (2006.01) |
| F16M 13/00 | (2006.01) |
| H04M 1/04 | (2006.01) |
| B60R 11/02 | (2006.01) |
| B60R 11/00 | (2006.01) |

(52) U.S. Cl.
CPC ........... *F16M 11/041* (2013.01); *B60R 11/02* (2013.01); *F16M 13/00* (2013.01); *F16M 13/022* (2013.01); *H04B 1/3877* (2013.01); *H04M 1/04* (2013.01); *B60R 11/0241* (2013.01); *B60R 2011/0056* (2013.01); *B60R 2011/0059* (2013.01); *B60R 2011/0071* (2013.01)

(58) Field of Classification Search
CPC .... F16M 13/022; F16M 11/041; F16M 13/00; B60R 11/02; H04B 1/3877
See application file for complete search history.

(56) References Cited

U.S. PATENT DOCUMENTS

| 5,457,745 | A | * | 10/1995 | Wang | .................. | B60R 11/0241 |
|---|---|---|---|---|---|---|
| | | | | | | 379/426 |
| 5,555,302 | A | * | 9/1996 | Wang | .................. | B60R 11/0241 |
| | | | | | | 379/426 |
| 5,694,468 | A | * | 12/1997 | Hsu | ...................... | B60R 11/0241 |
| | | | | | | 379/426 |
| 6,285,758 | B1 | * | 9/2001 | Lu | ....................... | B60R 11/0241 |
| | | | | | | 379/446 |

(Continued)

FOREIGN PATENT DOCUMENTS

| DE | 202010008994 U1 | * | 2/2011 | ........... | G06F 1/1626 |
|---|---|---|---|---|---|
| WO | WO-2015054796 A1 | * | 4/2015 | ............... | G06F 1/26 |

*Primary Examiner* — Eret C McNichols
(74) *Attorney, Agent, or Firm* — Leong C. Lei

(57) ABSTRACT

A full-automatic horizontal clamping holder includes a rear base, a bottom support arm, a left holding arm and a right holding arm mounted to the rear base. The full-automatic horizontal clamping holder further includes a return elastic member extending vertically for returning the bottom support arm upward. A linkage assembly is provided between the bottom support arm and the left and right holding arms for linking the left and right holding arms to horizontally move inward or outward so as to clamp or release a mobile phone.

6 Claims, 10 Drawing Sheets

(56) References Cited

U.S. PATENT DOCUMENTS

| | | | | |
|---|---|---|---|---|
| 7,272,984 B2* | 9/2007 | Fan | B60R 11/02 | |
| | | | 248/231.61 | |
| 7,537,190 B2* | 5/2009 | Fan | B60R 11/02 | |
| | | | 248/309.1 | |
| 7,913,963 B2* | 3/2011 | Cheng | B60R 11/02 | |
| | | | 248/205.5 | |
| 7,967,269 B2* | 6/2011 | Liu | G03B 21/58 | |
| | | | 248/176.3 | |
| 8,074,951 B2* | 12/2011 | Carnevali | B60R 11/02 | |
| | | | 108/143 | |
| 8,118,272 B2* | 2/2012 | Liou | F16M 13/02 | |
| | | | 248/176.3 | |
| 8,136,780 B2* | 3/2012 | Lin | F16M 11/28 | |
| | | | 248/316.4 | |
| 8,240,628 B2* | 8/2012 | Huang | F16M 11/041 | |
| | | | 248/122.1 | |
| 8,469,325 B2* | 6/2013 | Yu | G10G 5/005 | |
| | | | 248/231.51 | |
| 8,567,737 B2* | 10/2013 | Chen | F16M 11/041 | |
| | | | 248/313 | |
| 8,627,953 B1* | 1/2014 | Yeo | H04B 1/3888 | |
| | | | 206/320 | |
| 8,711,553 B2* | 4/2014 | Trinh | A47F 7/0246 | |
| | | | 248/206.5 | |
| 8,727,290 B1* | 5/2014 | De La Matta | F16M 11/40 | |
| | | | 248/122.1 | |
| 8,833,716 B2* | 9/2014 | Funk | F16M 13/02 | |
| | | | 248/316.4 | |
| 8,960,634 B2* | 2/2015 | Le Gette | F16M 11/04 | |
| | | | 248/163.1 | |
| 9,027,896 B2* | 5/2015 | Yeh | F16M 13/02 | |
| | | | 248/309.1 | |
| 9,062,818 B2* | 6/2015 | Fan | F16M 11/04 | |
| 9,080,716 B2* | 7/2015 | Mulhern | F16M 13/022 | |
| 9,103,492 B2* | 8/2015 | Springer | F16M 11/041 | |
| 9,161,466 B2* | 10/2015 | Huang | H05K 5/0204 | |
| 9,191,074 B2* | 11/2015 | Murar | H04B 5/0037 | |
| 9,194,532 B2* | 11/2015 | Bisesti | F16M 11/04 | |
| 9,469,253 B2* | 10/2016 | Brunard | B60R 11/02 | |
| 9,661,767 B2* | 5/2017 | Danicich | B60R 11/00 | |
| 9,749,002 B1* | 8/2017 | Fan | H04B 1/3888 | |
| 9,797,543 B2* | 10/2017 | Lin | E05B 73/0082 | |
| 10,001,153 B1* | 6/2018 | Fan | F16B 2/12 | |
| 10,207,652 B2* | 2/2019 | Yu | B60R 11/0241 | |
| 2006/0278788 A1* | 12/2006 | Fan | B60R 11/02 | |
| | | | 248/309.1 | |
| 2009/0294617 A1* | 12/2009 | Stacey | B60R 11/02 | |
| | | | 248/316.1 | |
| 2010/0051771 A1* | 3/2010 | Huang | F16M 11/08 | |
| | | | 248/289.11 | |
| 2010/0060532 A1* | 3/2010 | Kuang | H01Q 1/084 | |
| | | | 343/713 | |
| 2010/0079285 A1* | 4/2010 | Fawcett | E05B 73/0005 | |
| | | | 340/568.1 | |
| 2010/0108828 A1* | 5/2010 | Yu | F16M 11/041 | |
| | | | 248/123.11 | |
| 2011/0062299 A1* | 3/2011 | Tsai | F16M 11/041 | |
| | | | 248/231.41 | |
| 2012/0025036 A1* | 2/2012 | Huang | F16M 11/041 | |
| | | | 248/122.1 | |
| 2012/0273630 A1* | 11/2012 | Gillespie-Brown | F16M 11/041 | |
| | | | 248/122.1 | |
| 2012/0312936 A1* | 12/2012 | Huang | F16M 11/041 | |
| | | | 248/122.1 | |
| 2013/0092805 A1* | 4/2013 | Funk | F16M 13/02 | |
| | | | 248/121 | |
| 2013/0113348 A1* | 5/2013 | Holben | H05K 5/03 | |
| | | | 312/223.1 | |
| 2013/0148273 A1* | 6/2013 | Tsai | F16M 11/041 | |
| | | | 361/679.01 | |
| 2013/0206942 A1* | 8/2013 | Trotsky | F16M 11/041 | |
| | | | 248/274.1 | |
| 2013/0233986 A1* | 9/2013 | Rasheta | G03B 17/561 | |
| | | | 248/205.1 | |
| 2013/0240587 A1* | 9/2013 | Buchhalter | B60R 11/0241 | |
| | | | 224/570 | |
| 2014/0130334 A1* | 5/2014 | Chun | F16M 11/041 | |
| | | | 29/525.01 | |
| 2014/0226298 A1* | 8/2014 | Palmer | H05K 5/0208 | |
| | | | 361/807 | |
| 2014/0263931 A1* | 9/2014 | Chen | F16M 11/041 | |
| | | | 248/576 | |
| 2014/0376182 A1* | 12/2014 | Motoishi | F16M 11/2014 | |
| | | | 361/679.55 | |
| 2015/0129724 A1* | 5/2015 | Kohmoto | F16B 2/12 | |
| | | | 248/52 | |
| 2015/0163936 A1* | 6/2015 | Le Gette | F16M 11/04 | |
| | | | 206/45.2 | |
| 2015/0195938 A1* | 7/2015 | Witter | H05K 5/03 | |
| | | | 206/521 | |
| 2015/0240990 A1* | 8/2015 | Mulhern | F16M 13/022 | |
| | | | 248/288.11 | |
| 2015/0292669 A1* | 10/2015 | Floersch | G06F 1/1626 | |
| | | | 248/553 | |
| 2015/0313026 A1* | 10/2015 | Yu | G06F 1/1626 | |
| | | | 248/285.1 | |
| 2015/0359114 A1* | 12/2015 | Yang | F16M 11/041 | |
| | | | 248/161 | |
| 2016/0018051 A1* | 1/2016 | Lin | F16M 11/041 | |
| | | | 248/122.1 | |
| 2019/0260865 A1* | 8/2019 | Yang | H04M 1/04 | |

* cited by examiner

FULL-AUTOMATIC HORIZONTAL CLAMPING HOLDER

CROSS REFERENCE TO RELATED APPLICATIONS

This is a divisional application of co-pending patent application Ser. No. 15/561,073, filed on Sep. 25, 2017, which is a national stage of PCT Application No. PCT/CN2016/110003, filed on Dec. 15, 2016.

BACKGROUND OF THE INVENTION

1. Field of the Invention

The present invention relates to a holder used for a mobile device, such as a mobile phone, and more particularly to a full-automatic horizontal clamping holder.

2. Description of the Prior Art

These days, with the popularity of mobile phones and other mobile devices, mobile phone holders have been widely used. Most of conventional mobile phone holders are operated manually for clamping a mobile phone.

Some of the mobile phone holders have an automatic clamping design which is provided with a pressure sensor to detect whether or not a mobile phone is placed. A microcontroller according to the detected rotational state of the mobile phone controls an electric driver to achieve an automatic clamping function. This holder has a complex structure, high production cost, high power consumption, high failure rate, poor stability of use, and other deficiencies, so it is not suitable for popularization and application.

Accordingly, the inventor of the present invention has devoted himself based on his many years of practical experiences to solve these problems.

SUMMARY OF THE INVENTION

In view of the shortcomings of the prior art, the primary object of the present invention is to provide a full-automatic horizontal clamping holder. By taking advantage of the weight of a mobile phone to move a bottom support arm downward, left and right holding arms are horizontally linked to move inward so as to clamp a mobile phone tightly. The holder has a simple structure and a stable and reliable linkage, and is practical, easy to produce, and suitable for popularization and application.

In order to achieve the aforesaid object, the full-automatic horizontal clamping holder of the present invention comprises a rear base, a bottom support arm, a left holding arm and a right holding arm mounted to the rear base. The full-automatic horizontal clamping holder further includes a return elastic member extending vertically for returning the bottom support arm upward. The return elastic member is connected to the bottom support arm. A linkage assembly is provided between the bottom support arm and the left and right holding arms for linking the left and right holding arms to horizontally move inward or outward so as to clamp or release a mobile phone.

The present invention has obvious advantages and advantages as compared with the prior art. More specifically, it is understood from the above-described technical solution that the features of the present invention are the arrangement of the return elastic member and the linkage relationship design between the bottom support arm and the left and right holding arms. By taking advantage of the weight of the mobile phone to move the bottom support arm downward, the left and right holding arms are horizontally linked to move inward so as to clamp the mobile phone tightly. When the mobile phone is taken out, the bottom support arm is displaced upward along with the returning of the return elastic member, meanwhile, the left and right holding arms are linked to move outward so as to release the mobile phone. The holder is especially suitable for automotive applications, user-friendly operation, easy to use, and practical. The holder has a simple structure and a stable and reliable linkage, and is easy to produce and suitable for popularization and application.

DETAILED DESCRIPTION OF THE PREFERRED EMBODIMENTS

Embodiments of the present invention will now be described, by way of example only, with reference to the accompanying drawings.

FIG. 1 to FIG. 5 illustrates a full-automatic horizontal clamping holder according to a first embodiment of the present invention. The full-automatic holder is mainly used in a vehicle-mounted occasion, but not limited thereto. The full-automatic transverse clamping holder comprises a rear base 10, a bottom support arm 20, a left holding arm 30, and a right holding arm 40 mounted to the rear base 10.

Figure 8:
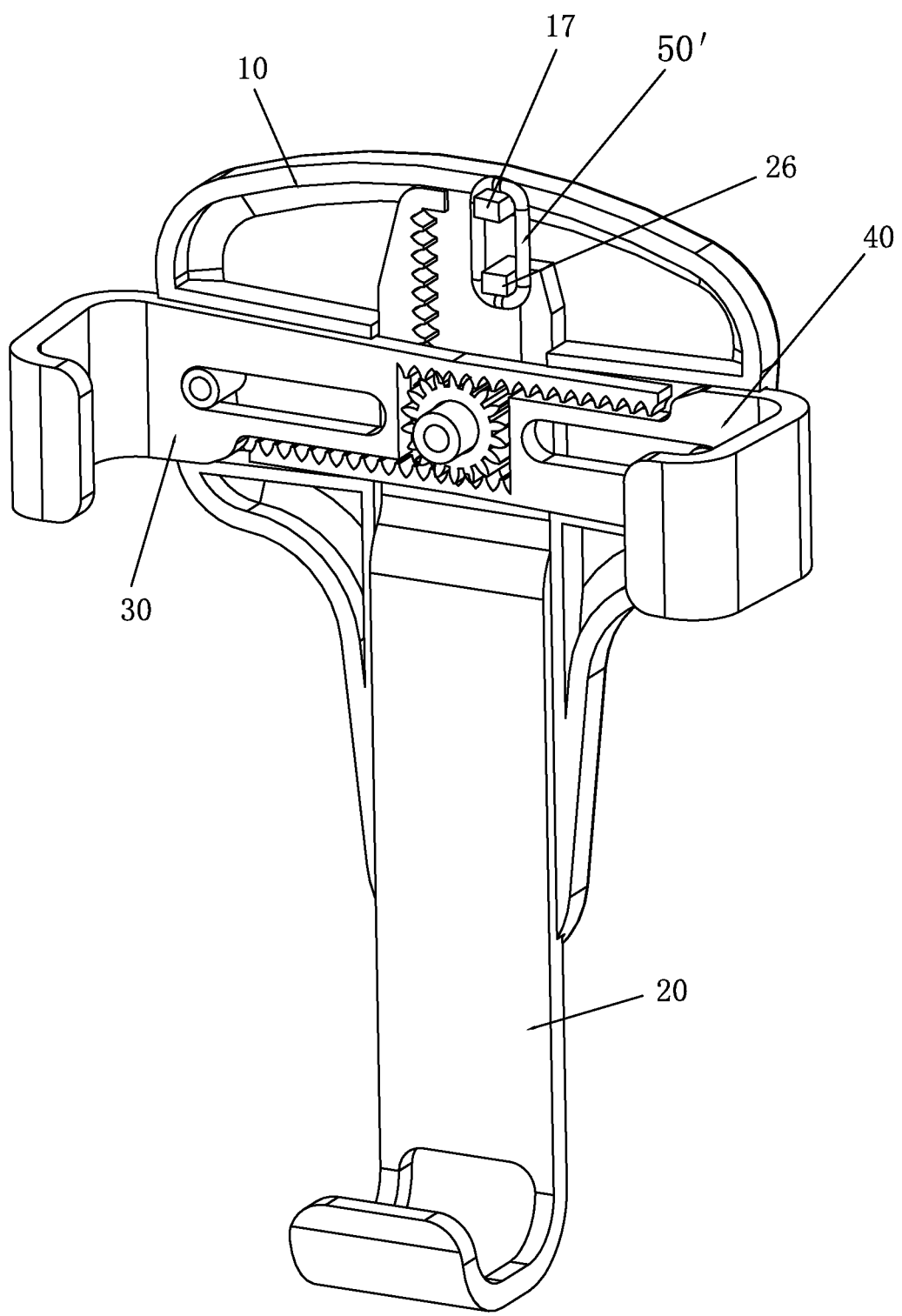
FIG. 8 is a schematic view of the present invention, showing that the return elastic member is an elastic rubber band.
Figure 9:
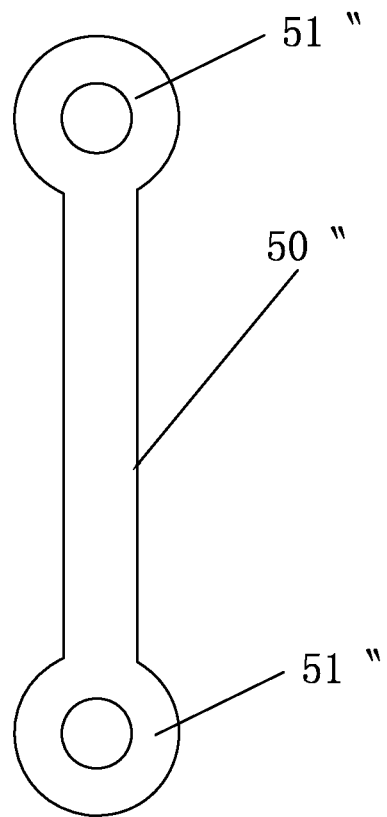
FIG. 9 is a schematic view of the present invention, showing that the return elastic member is an elastic rubber strap.

The full-automatic transverse clamping holder further comprises a return elastic member 50 extending vertically to return the bottom support arm 20 upward. The return elastic member 50 is connected to the bottom support arm 20. The return elastic member 50 may be a pressure elastic member or a tension elastic member, but not limited to a conventional pressure spring and a tension spring. It may be any elastic member able to return upward when the weight of a mobile device is released. In case the return elastic member 50 is a pressure elastic member, it is preferably a pressure spring. A lower end of the pressure spring is connected to the rear base 10, and an upper end of the pressure spring is connected to or leans against the bottom support arm 20. In this embodiment, the bottom support arm 20 is provided with a vertical receiving groove 21. Atop of the receiving groove 21 is connected with a mounting post 22 extending downward. The pressure spring is fitted on the outer circumference of the mounting post 22. The rear base 10 is provided with a guide post 11 protruding forward. The guide post 11 extends into the receiving groove 21 to ensure a precise vertical movement of the bottom support arm 20. In case the return elastic member 50 is an extension elastic member, it is preferably an extension spring. The return elastic member 50 may be an elastic rubber band or an elastic rubber strap according to the demand. An upper end of the tension elastic member is connected to the rear base 10, and a lower end of the tension elastic member is connected to the bottom support arm 20. As shown in FIG. 8, an elastic rubber band 50' may be directly fitted on an upper positioning post 17 of the rear base 10 and a lower positioning post 26 of the bottom support arm 20. As shown in FIG. 9, the return elastic member may be an elastic rubber strap 50". The elastic rubber strap 50" has annular portions 51" at two ends thereof. The annular portions 51" are fitted on the corresponding upper positioning post 17 and the lower positioning post 26, respectively. The return elastic member referred to herein is not limited to the illustrated pressure spring, the tension spring, the elastic rubber band, and the elastic rubber strap. It may be other different suitable return elastic members.

The bottom support arm 20 is connected with a support portion for supporting a mobile device. A linkage assembly is provided between the bottom support arm 20 and the left and right holding arms 30, 40 for linking the left holding arm 30 and the right holding arm 40 to horizontally move inward or outward so as to clamp or release the mobile device. When a mobile phone 90 is placed in the holder, the bottom support arm 20 is moved downward by the weight of the mobile device, meanwhile, the bottom support arm 20 links the left holding arm 30 and the right holding arm 40 to move inward horizontally through the linkage assembly so as to clamp the mobile device tightly. When the bottom support arm 20 is released from the weight of the mobile device, the bottom support arm 20 is displaced upward along with the returning of the return elastic member 50, meanwhile, the bottom support arm 20 links the left holding arm 30 and the right holding arm 40 to move outward horizontally through the linkage assembly so as to release the mobile device. The linkage assembly may have a variety of different structural designs. The upward or downward displacement of the bottom support arm 20 simultaneously drives the left holding arm 30 and the right holding arm 40 to displace left and right by means of the linkage assembly. As a preferred design, the bottom support arm 20 is provided with a vertical stroke groove 23. The linkage assembly includes a vertical straight gear rack portion 24 at an inner side of the stroke groove 23 and a gear 60 fixed to the rear base 10. The gear 60 is inserted in the stroke groove 23. The gear 60 has outer teeth to engage with the vertical straight gear rack portion 24. The gear 60 simultaneously links the left holding arm 30 and the right holding arm 40 to move inward or outward.

Figure 1:
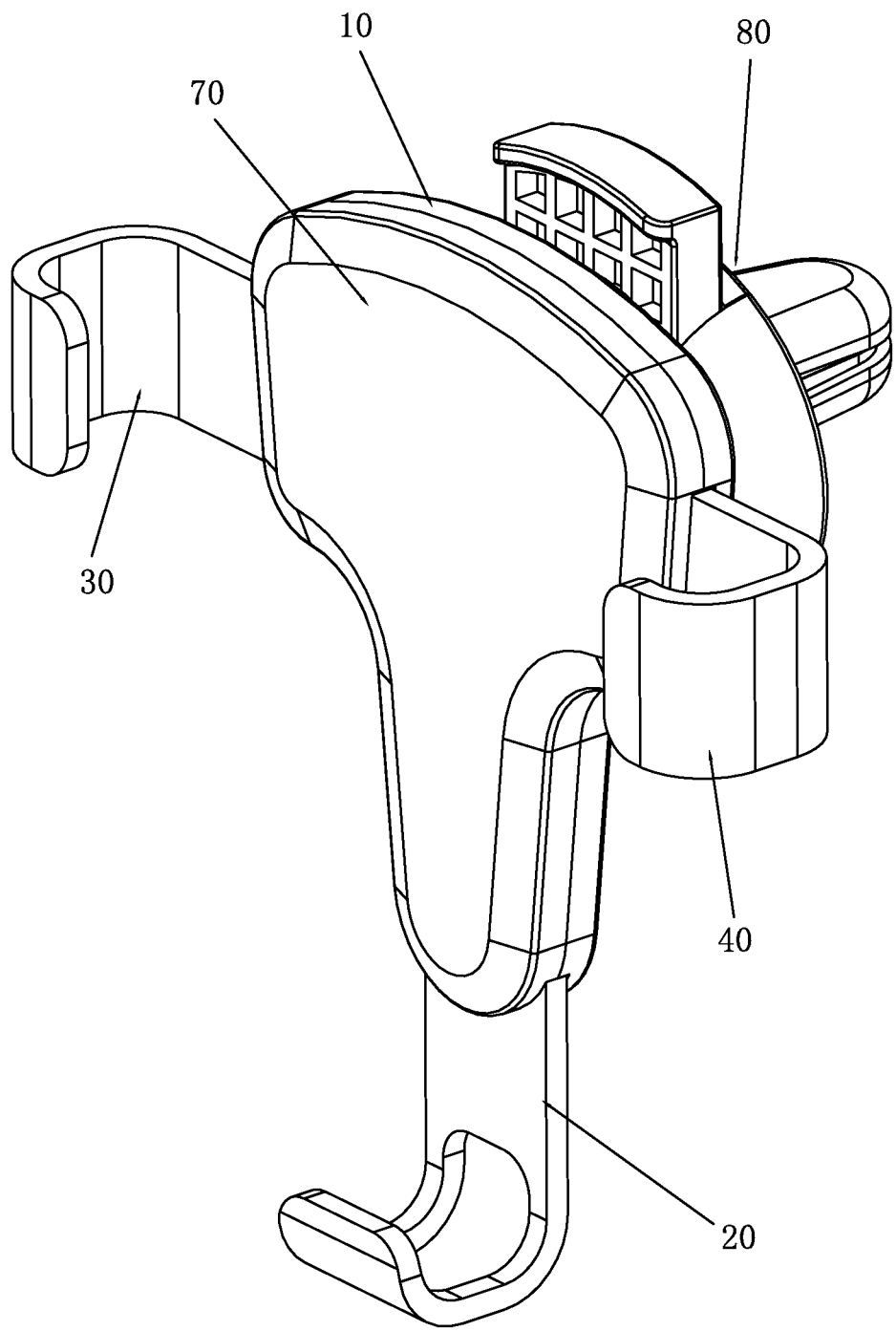
FIG. 1 is a perspective view according to a first embodiment of the present invention.
Figure 2:
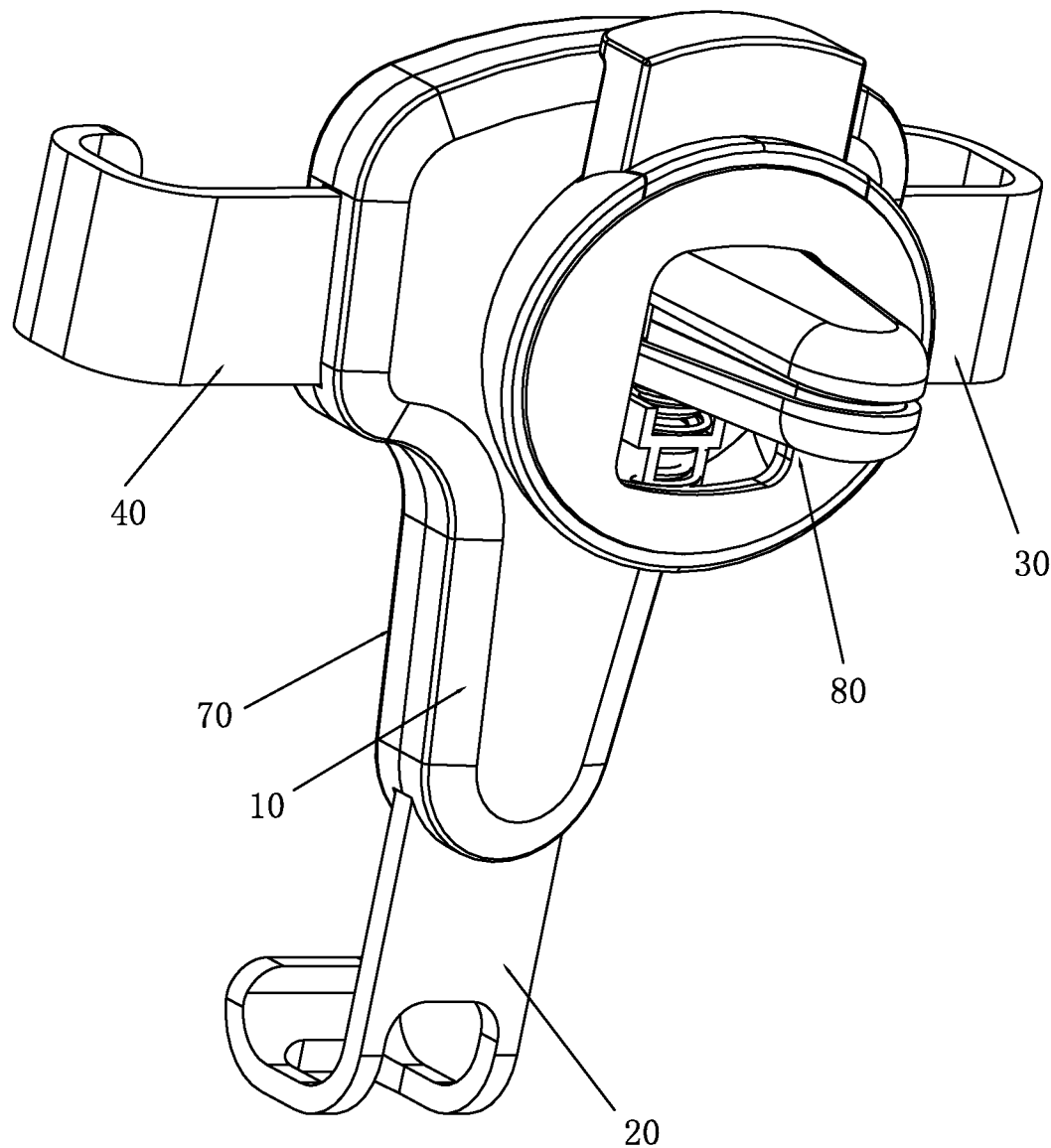
FIG. 2 is another perspective view according to the first embodiment of the present invention.
Figure 3:
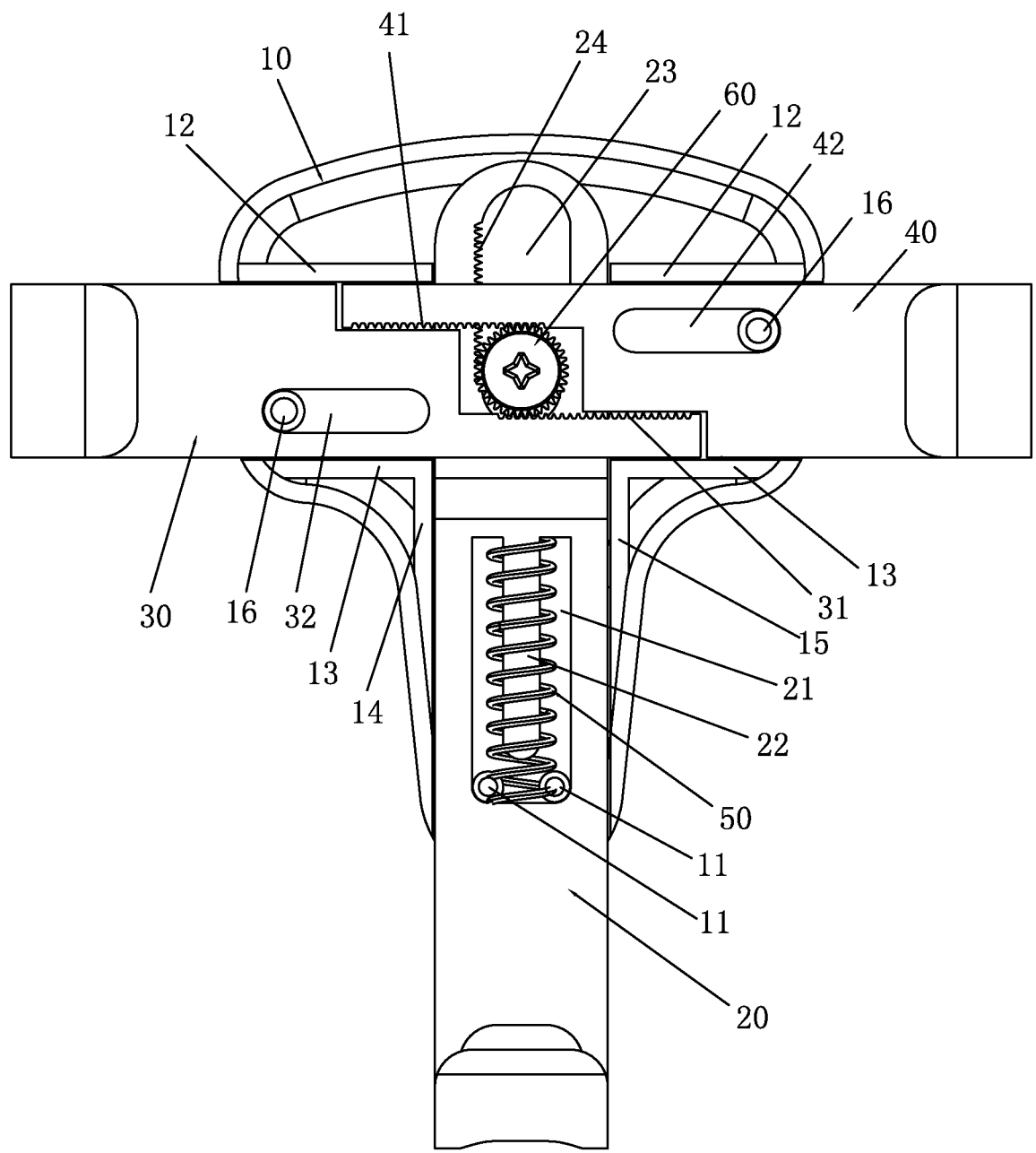
FIG. 3 is a partial view according to the first embodiment of the present invention.
Figure 4:
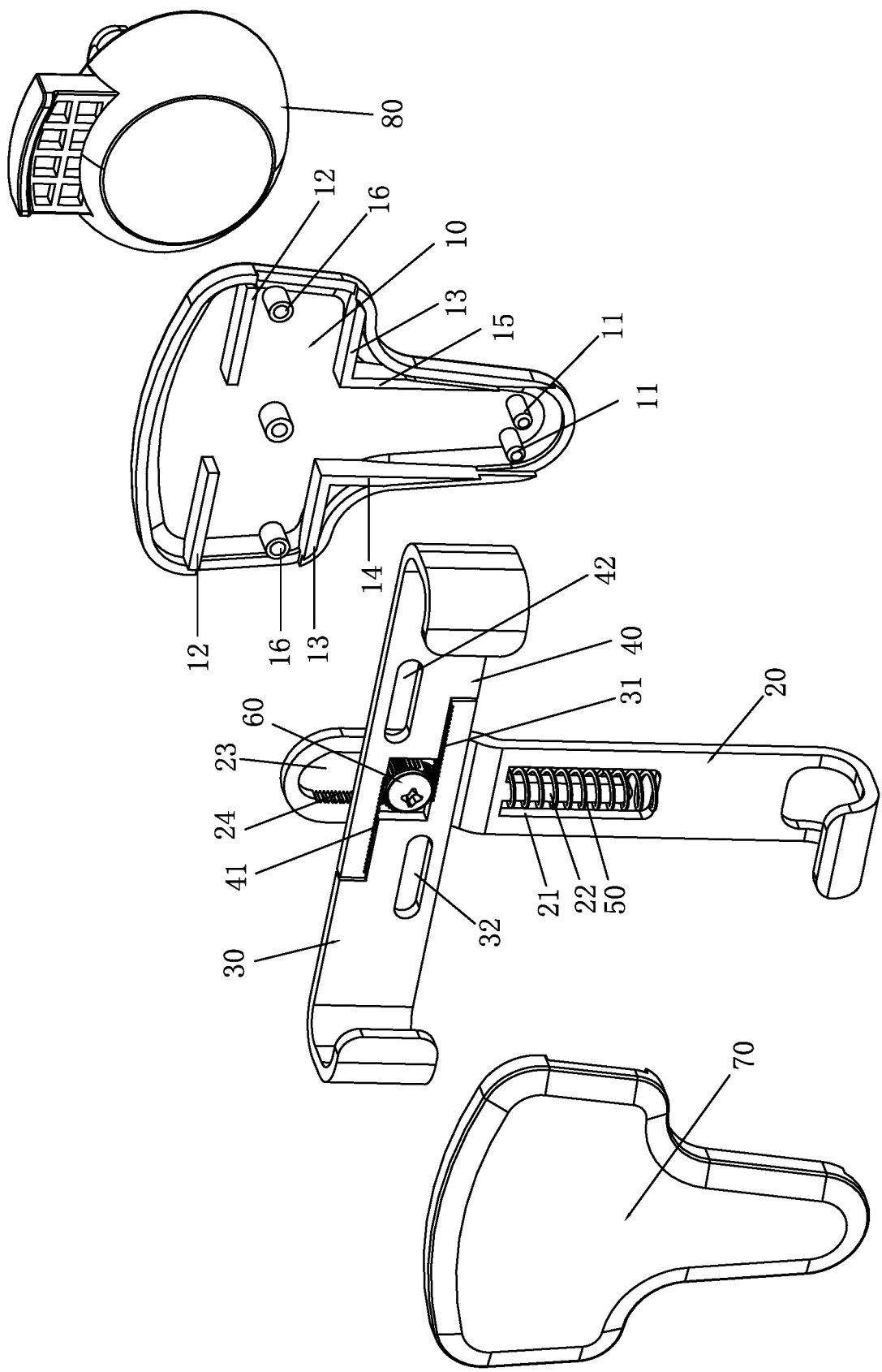
FIG. 4 is an exploded view according to the first embodiment of the present invention.
Figure 5:
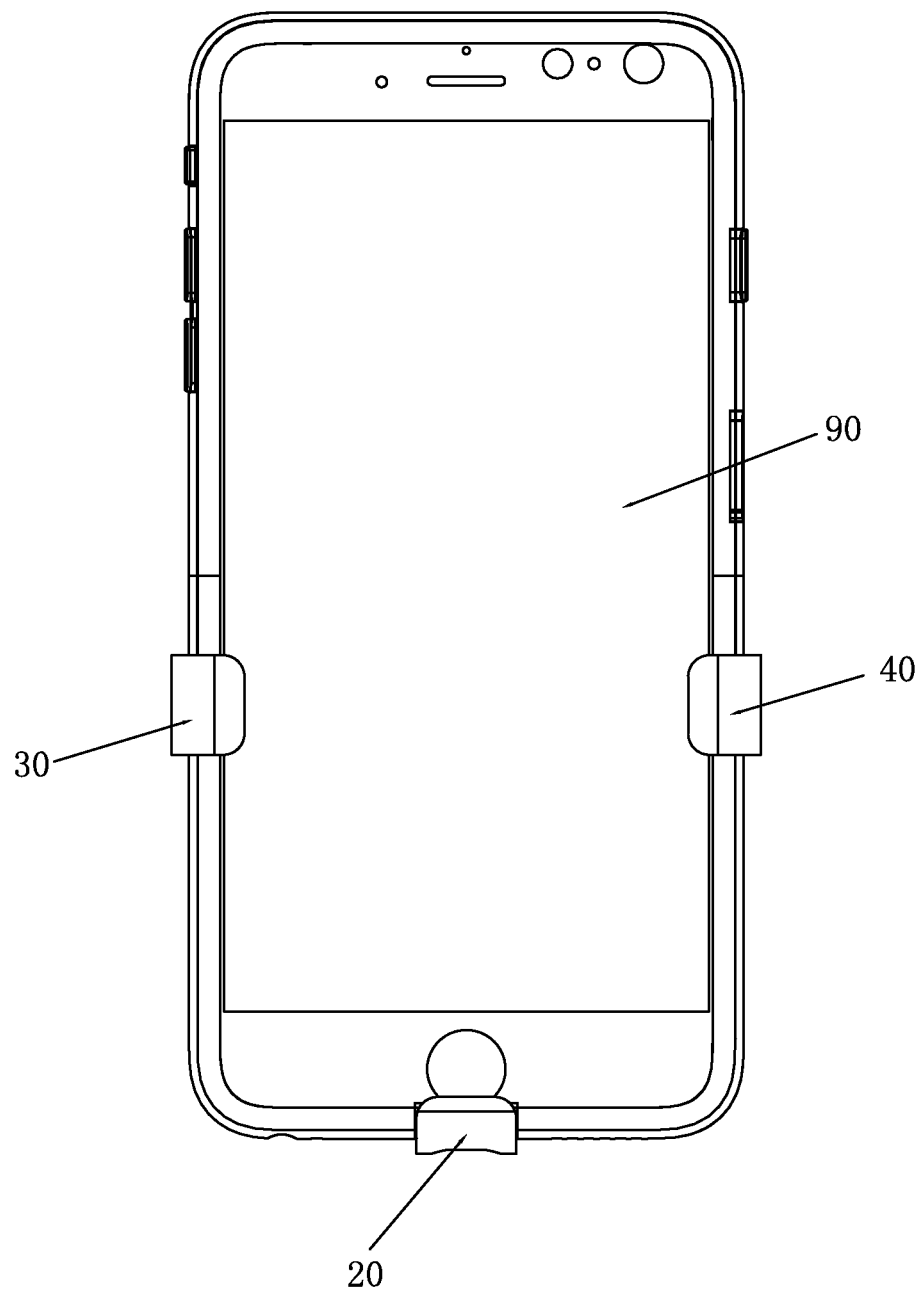
FIG. 5 is a schematic view according to the first embodiment of the present invention when in use.

In the first embodiment, the left holding arm 30 and the right holding arm 40 have horizontal straight gear rack portions 31, 41, respectively. The two horizontal straight gear rack portions 31, 41 are engaged with the top and the bottom of the gear 60, respectively. In the first embodiment, as shown in FIG. 3 and FIG. 4, the vertical straight gear rack portion 24 is disposed at the left inner side of the stroke groove 23. The horizontal straight gear rack portion 31 of the left holding arm 30 is engaged with the bottom of the gear 60. The horizontal straight gear rack portion 41 of the right holding arm 40 is engaged with the top of the gear 60. The vertical straight gear rack portion 24 may be disposed at the right inner side of the stroke groove 23. The horizontal straight gear rack portion 31 of the left holding arm 30 may be engaged with the top of the gear 60. The horizontal straight gear rack portion 41 of the right holding arm 40 may be engaged with the bottom of the gear 60. In the first embodiment, the left holding arm 30 and the right holding arm 40 are engaged with the gear 60 through the horizontal straight gear rack portions 31, 41 of the left holding arm 30 and the right holding arm 40, respectively.

In the first embodiment, a front of the rear base 10 is provided with a front cover 70. An accommodation room is formed between the front cover 70 and the rear base. The left holding arm 30, the right holding arm 40, the bottom support arm 20, the gear 60, and the return elastic member 50 are located in the accommodation room. A bottom, a left side and a right side of the accommodation room have openings 30, respectively. A left end of the left holding arm 30, a right end of the right holding arm 40, and a bottom end of the bottom support arm 20 extend outward from the respective openings 30.

When the mobile device 90 is placed, the bottom support arm 20 is pressed by the weight of the mobile device to move downward. The vertical straight gear rack portion 24 engages with and drives the gear 60, and the gear 60 simultaneously engages with the two horizontal straight gear rack portions 31, 41 to link the left holding arm 30 and the right holding arm 40 to move inward so as to clamp the mobile device tightly. When the mobile device 90 is taken out, the bottom support arm 20 is displaced upward along with the returning of the return elastic member 50. The vertical straight gear rack portion 24 engages with and drives the gear 60, and the gear 60 simultaneously engages with the two horizontal straight gear rack portions 31, 41 to link the left holding arm 30 and the right holding arm 40 to move outward so as to release the mobile device.

The rear base 10 is provided with an upper limit portion 12 and a lower limit portion 13 for the left holding arm 30 and the right holding arm 40. The rear base 10 is provided with a left limit portion 14 and a right limit portion 15 for the bottom support arm 20. The rear base 10 is provided with stroke limit posts 16 for the left holding arm 30 and the right holding arm 40. The left holding arm 30 and the right holding arm 40 are formed with left and right stroke limit grooves 32, 42. The stroke limit posts 16 are inserted in the corresponding stroke limit grooves 32, 42, so that the accuracy of the left and right displacement of the left holding arm 30 and the right holding arm 40 can be ensured.

The rear of the rear base 10 is provided with a mounting seat 80 for mounting the full-automatic holder. In general, a mobile phone holder is mounted to a vehicle by means of a sucking disc or fixed to the outlet of the air conditioner. The first embodiment of FIG. 1 to FIG. 4 illustrates a mounting seat to be fixed the outlet of the air conditioner. However, this is not limited to the mounting structure. The full-automatic holder of the present invention may be applicable to a variety of mounting seats.

Figure 6:
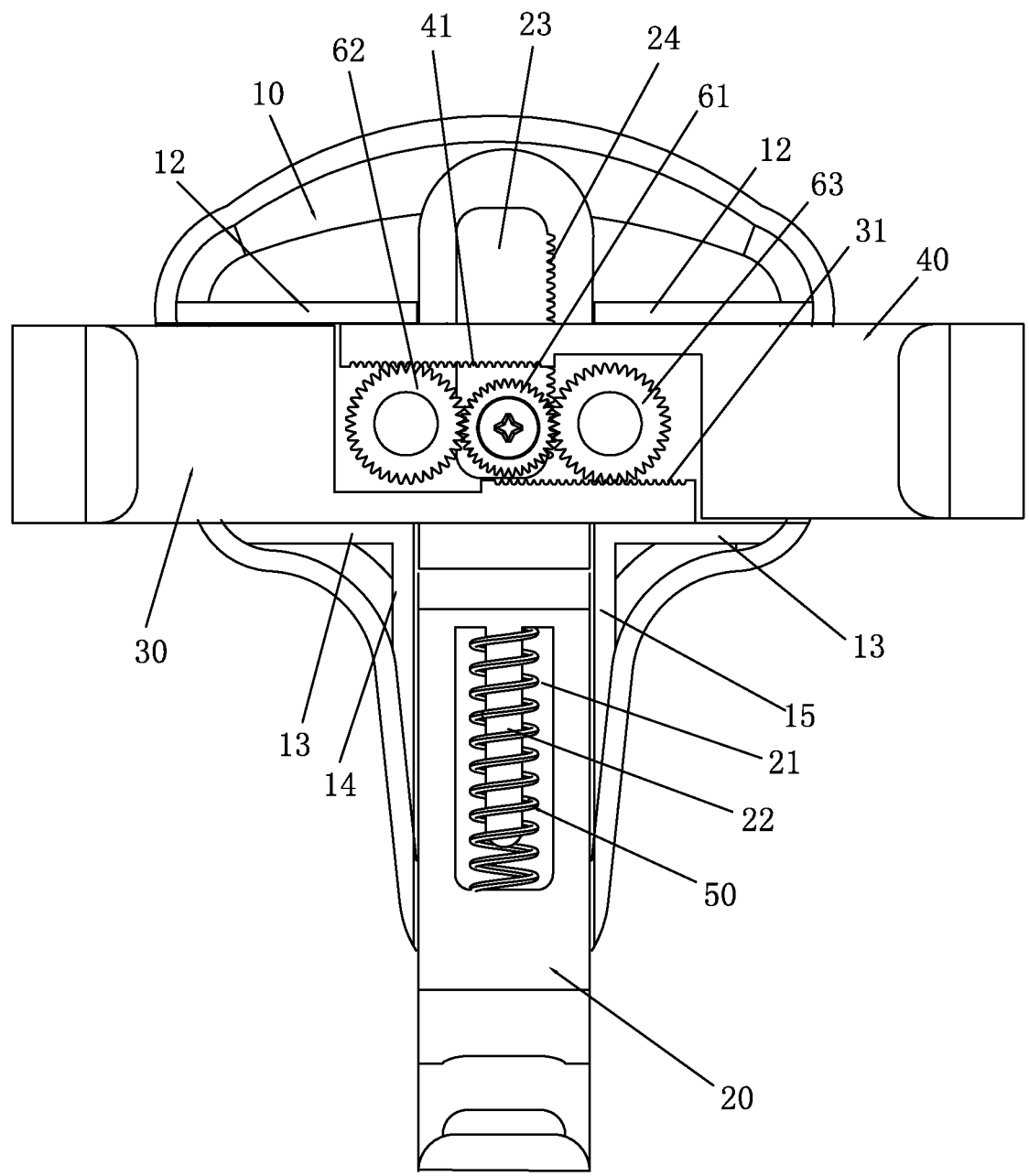
FIG. 6 is a partial view according to a second embodiment of the present invention.

FIG. 6 illustrates a second embodiment of the present invention, which is substantially similar to the first embodiment with the exceptions described hereinafter. The main difference is the linkage structure and relationship between the bottom support arm 20 and the left and right holding arms 30, 40.

Figure 7:
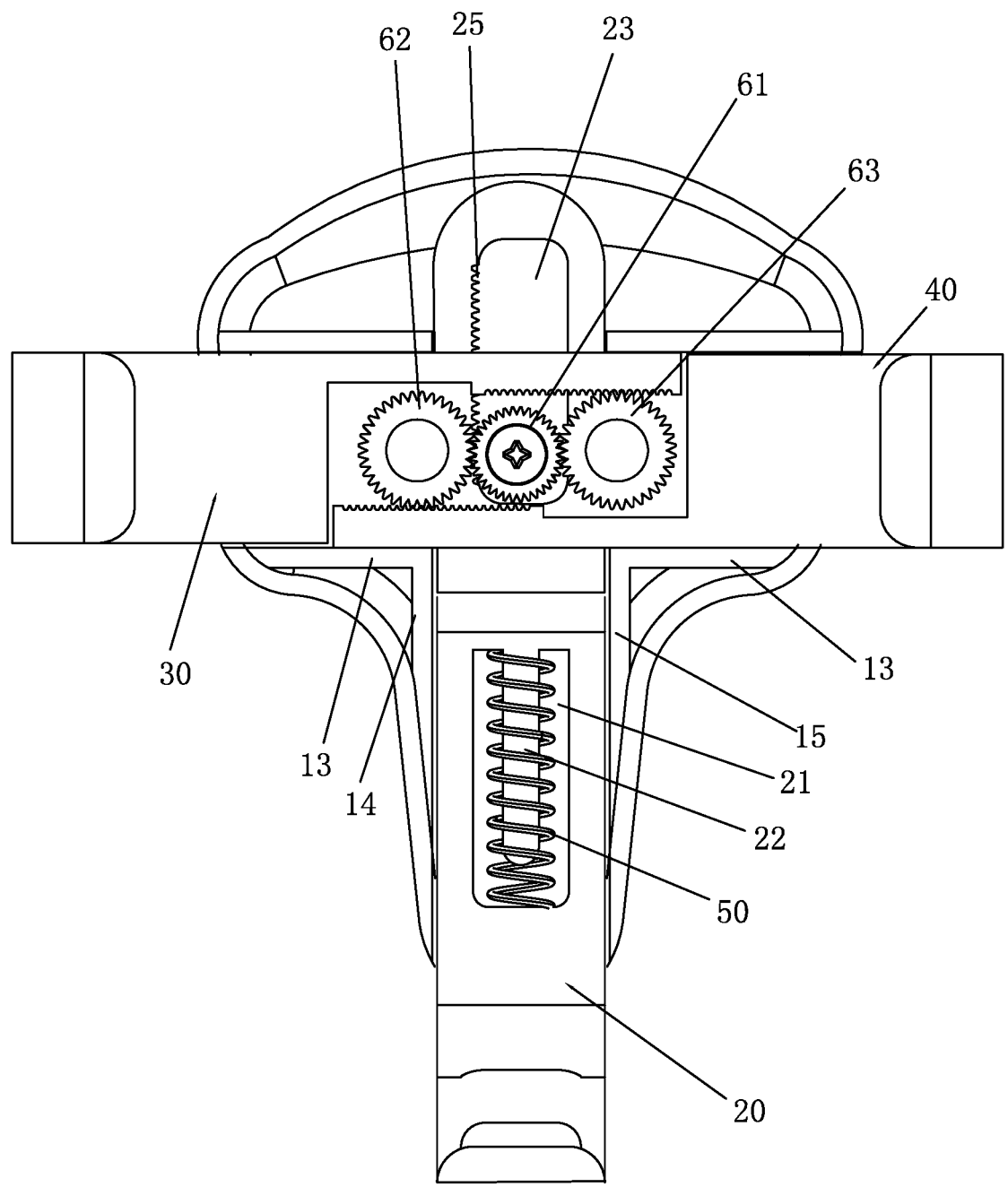
FIG. 7 is a partial view according to a third embodiment of the present invention.

In the second embodiment, the rear side base 10 is fixedly provided with an intermediate gear 61. The intermediate gear 61 is inserted into the stroke groove. The intermediate gear 61 has outer teeth. The outer teeth of the intermediate gear 61 are engaged with the vertical straight gear rack portion. Left and right sides of the intermediate gear 61 are engaged with a left gear 62 and a right gear 63, respectively. The left holding arm 30 and the right holding arm 40 have horizontal straight gear rack portions 31, 41. The two horizontal straight gear rack portions 31, 41 are engaged with the left gear 62 and the right gear 63, respectively. Specifically, as shown in FIG. 6, the vertical straight gear rack portion 24 is disposed at the right inner side of the stroke groove 23. The horizontal straight gear rack portion 31 of the left holding arm 30 is engaged with the bottom of the right gear 63. The horizontal straight gear rack portion 41 of the right holding arm 40 is engaged with the top of the left gear 62. As shown in FIG. 7 (namely, a third embodiment), the vertical straight gear rack portion 25 is disposed at the left inner side of the stroke groove 23. The horizontal straight gear rack portion 31 of the left holding arm 30 is engaged with the top of the right gear 63. The horizontal straight gear rack portion 41 of the right holding arm 40 is engaged with the bottom of the left gear 62.

When the mobile device 90 is placed, the bottom support arm 20 is pressed by the weight of the mobile device to move downward. The vertical straight gear rack portion 24 (or 25) of the bottom support arm 20 drives the intermediate gear 61, and the intermediate gear 61 simultaneously drives the left and right gears 62, 63 to link the left holding arm 30 and the right holding arm 40 to move inward so as to clamp the mobile device tightly. When the mobile device 90 is taken out, the bottom support arm 20 is displaced upward along with the returning of the return elastic member 50. The vertical straight gear rack portion 24 (or 25) drives the intermediate gear 61, and the intermediate gear 61 simultaneously drives the left and right gears 62, 63 to link the left holding arm 30 and the right holding arm 40 to move outward so as to release the mobile device.

Figure 10:
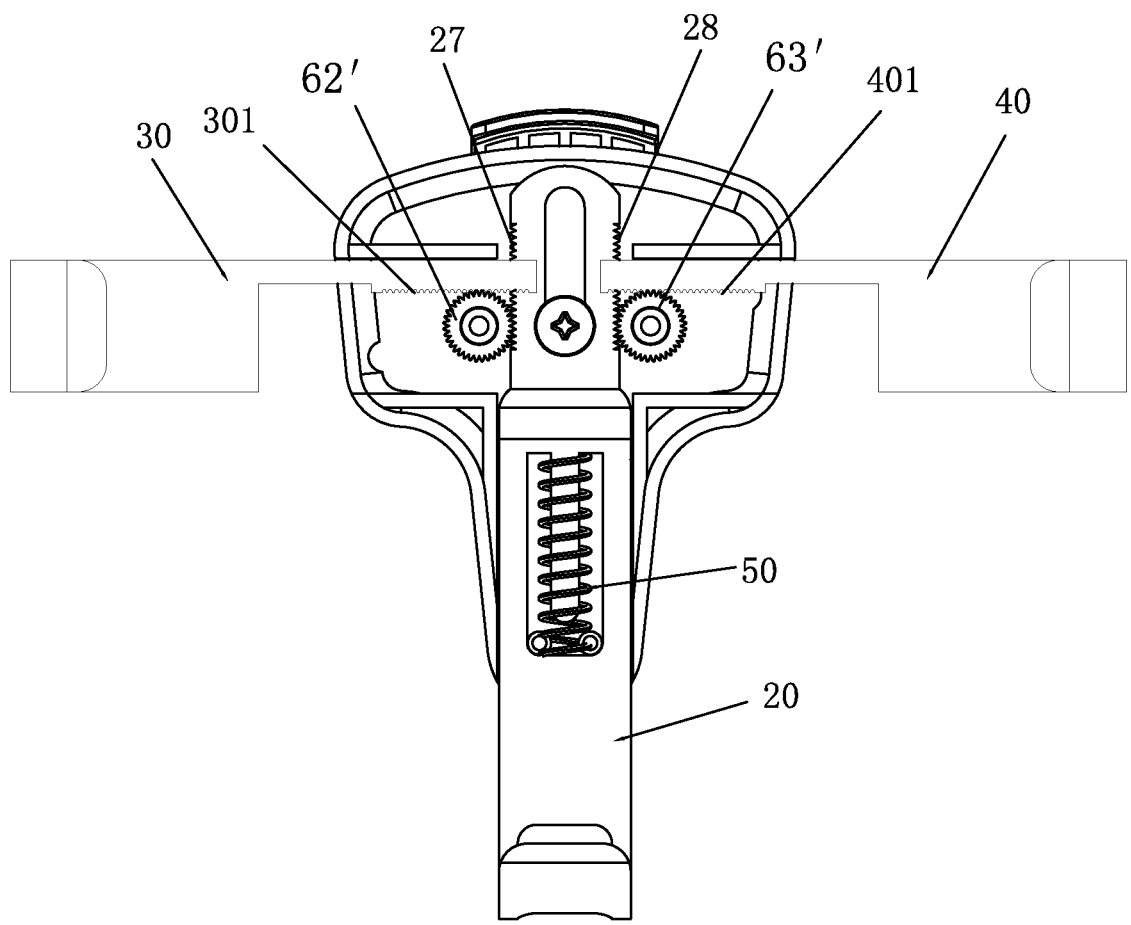
FIG. 10 is a partial view according to a fourth embodiment of the present invention.

FIG. 10 illustrates a fourth embodiment of the present invention, which is substantially similar to the first embodiment with the exceptions described hereinafter. Left and right sides of the bottom support arm are formed with vertical straight gear rack portions 27, 28. The left gear and the right gear are engaged with the corresponding vertical straight gear rack portions. The left holding arm 30 and the right holding arm 40 have horizontal straight gear rack portions 301, 401, respectively. The two horizontal straight gear rack portions 301, 401 are engaged with the tops of the left gear 62' and the right gear 63'. When the bottom support arm 20 is pressed by the weight of the mobile device to move downward, the vertical straight gear rack portions 27, 28 of the bottom support arm 20 respectively drive the left gear 62' and the right gear 63' to link the left holding arm 30 and the right holding arm 40 to move inward so as to clamp the mobile device tightly. On the contrary, when the mobile device is taken out, the bottom support arm 20 is displaced upward along with the returning of the return elastic member 50. The vertical straight gear rack portions 27, 28 of the bottom support arm 20 respectively drive the left gear 62' and the right gear 63' to link the left holding arm 30 and the right holding arm 40 to move outward so as to release the mobile device.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A full-automatic horizontal clamping holder, comprising a rear base, a bottom support arm, a left holding arm and a right holding arm mounted to the rear base; the full-automatic horizontal clamping holder further comprising a return elastic member extending vertically for returning the bottom support arm upward, the return elastic member being connected to the bottom support arm; a linkage assembly being provided between the bottom support arm and the left and right holding arms for linking the left and right holding arms to horizontally move inward or outward;

wherein the bottom support arm is provided with a vertical stroke groove, the linkage assembly includes a vertical straight gear rack portion at a right inner side of the stroke groove and an intermediate gear fixed to the rear base; the intermediate gear is inserted in the stroke groove, the intermediate gear has outer teeth to engage with the vertical straight gear rack portion;

left and right sides of the intermediate gear are engaged with a left gear and a right gear respectively; the left holding arm and the right holding arm have horizontal straight gear rack portions respectively, the horizontal straight gear rack portion of the left holding arm is engaged with a bottom of the right gear, the horizontal straight gear rack portion of the right left holding arm is engaged with a top of the left gear, the intermediate gear simultaneously links the left and right holding arms to horizontally move inward or outward.

2. The full-automatic horizontal clamping holder as claimed in claim 1, wherein the return elastic member is a pressure elastic member, a lower end of the pressure elastic member is connected to the rear base, and an upper end of the pressure elastic member is connected to the bottom support arm.

3. The full-automatic horizontal clamping holder as claimed in claim 2, wherein the bottom support arm is provided with a vertical receiving groove, a top of the receiving groove is connected with a mounting post extending downward, the pressure elastic member is a pressure spring, the pressure spring is fitted on the mounting post.

4. The full-automatic horizontal clamping holder as claimed in claim 1, wherein the rear base is provided with an upper limit portion and a lower limit portion for the left holding arm and the right holding arm; and the rear base is provided with a left limit portion and a right limit portion for the bottom support arm.

5. The full-automatic horizontal clamping holder as claimed in claim 1, wherein a front of the rear base is provided with a front cover, an accommodation room is formed between the front cover and the rear base, the left holding arm, the right holding arm, the bottom support arm, the gear, and the return elastic member are located in the accommodation room; a bottom, a left side and a right side of the accommodation room have openings respectively, a left end of the left holding arm, a right end of the right holding arm, and a bottom end of the bottom support arm extend outward from the respective openings.

6. The full-automatic horizontal clamping holder as claimed in claim 1, wherein a rear of the rear base is provided with a mounting seat for mounting the full-automatic horizontal clamping holder.

* * * * *